United States Patent
Hanley et al.

(10) Patent No.: US 8,689,409 B2
(45) Date of Patent: Apr. 8, 2014

(54) PANEL MOUNTING CLIP WITH ADHESIVES

(75) Inventors: Ronald Charles Hanley, Auckland (NZ); Gregory John Kelly, Auckland (NZ)

(73) Assignee: Fastmount Limited, Auckland (NZ)

( * ) Notice: Subject to any disclaimer, the term of this patent is extended or adjusted under 35 U.S.C. 154(b) by 131 days.

(21) Appl. No.: 12/737,351

(22) PCT Filed: Jul. 3, 2009

(86) PCT No.: PCT/NZ2009/000135
§ 371 (c)(1),
(2), (4) Date: Mar. 16, 2011

(87) PCT Pub. No.: WO2010/002280
PCT Pub. Date: Jan. 7, 2010

(65) Prior Publication Data
US 2011/0176863 A1  Jul. 21, 2011

Related U.S. Application Data

(60) Provisional application No. 61/129,546, filed on Jul. 3, 2008.

(51) Int. Cl.
*F16B 2/20* (2006.01)
*F16B 5/06* (2006.01)
*F16B 21/06* (2006.01)
*F16B 11/00* (2006.01)

(52) U.S. Cl.
USPC .............. 24/457; 24/304; 24/297; 24/581.11; 24/114.6; 24/693; 248/205.3; 411/82; 411/82.3

(58) Field of Classification Search
USPC .............. 24/304, 457, 297, 581.11, 104, 107, 24/108, 114.4, 114.05, 114.6, 693; 248/205.3; 411/82, 82.3
See application file for complete search history.

(56) References Cited

U.S. PATENT DOCUMENTS 2,385,296 A * 9/1945 Moore .......................... 248/74.1
4,576,664 A * 3/1986 Delahunty ...................... 156/71
4,636,124 A   1/1987 Gugle
4,838,786 A   6/1989 Reher (Continued)

FOREIGN PATENT DOCUMENTS

DE   101 43 542   3/2003
EP   1 902 903    3/2008

OTHER PUBLICATIONS

Translation of Specification of DE 10143542, dated Dec. 2, 2012.*

*Primary Examiner* — Robert J Sandy
*Assistant Examiner* — Michael Lee
(74) *Attorney, Agent, or Firm* — Jacobson Holman PLLC

(57) ABSTRACT

A fastener for mounting a panel to a supporting structure includes a fastener part having a base with an upper and lower side. A connector is adapted to engage with another fastener part projecting from the upper side of the base. The lower side of the base is adapted to be adhesively connected to a substrate and incorporating a surface configuration that promotes a mechanical connection with an adhesive. The lower side surface configuration includes a protrusion extending from the base to a crown. The protrusion includes an undercut portion configured to form a mechanical connection with the adhesive. In use adhesive fills between the protrusions and forms a mechanical connection with the undercut portions when hardened.

12 Claims, 7 Drawing Sheets

(56) References Cited

U.S. PATENT DOCUMENTS

| | | | |
|---|---|---|---|
| 5,267,854 A * | 12/1993 | Schmitt | 433/8 |
| 5,295,823 A | 3/1994 | Farzin-Nia | |
| 5,829,972 A | 11/1998 | Farzin-Nia | |
| 5,829,973 A | 11/1998 | Andreiko | |
| 6,071,117 A | 6/2000 | Andreiko | |
| 6,190,165 B1 | 2/2001 | Andreiko | |
| 2007/0160949 A1 | 7/2007 | Voudouris | |

* cited by examiner

PANEL MOUNTING CLIP WITH ADHESIVES

This is a national stage of PCT/NZ09/000135 filed Jul. 3, 2009 and published in English, claiming benefit of US provisional application number 61/129,546, filed Jul. 3, 2008, hereby incorporated by reference.

BACKGROUND OF THE INVENTION

The present invention relates to devices and arrangements for removably mounting panels to underlying support structures.

SUMMARY OF THE PRIOR ART

In the luxury boat, recreational vehicle (RV or campervan) and aviation industries, there is a general desire for wall and or sealing panels to be fixed in place but able to be removed and reinstalled as necessary for maintenance and refurbishment, or for accessing areas behind the panels. In a typical construction, the panels are mounted to a supporting structure framework fixed to the hull forming part of the hull, vehicle body or fuselage. A typical panel is formed from a sheet material such as plywood and upholstered or veneered on its outer base and edges.

One current approach to fixing the panels to the framework involves large quantifies of hook and loop fastening materials such as VELCRO. Lines of the hook material are secured to one of the panel or framework, and corresponding lines of the loop material are applied to the other of the panel and the framework. The panel is lifted into place, positioned, and pressed against the framework to engage the hook and loop components. This hook and loop attachment has the disadvantages that security of the connection can deteriorate over time, the effectiveness of the hooks and/or loops can deteriorate over repeated removal and reinstatement, the panels must be located by eye during re-installment and can end inaccurately mounted, the depth of mounting the panel to the framework isn't always consistent and a great quantity of the fastening material is required to securely hold the panels in place, with an associated high cost for materials and labour.

SUMMARY OF THE INVENTION

It is an object of the present invention to provide panel mounting arrangements and elements thereof which at least go some way toward overcoming the above disadvantages or which will provide the public with a useful choice.

In one aspect the present invention broadly consists in a fastener for mounting a panel to a supporting structure including a fastener part comprising a base with an upper and lower side,
  a connector projecting from the upper side of the base adapted to engage with another fastener part,
  the lower side of the base adapted to be adhesively connected to a substrate and incorporating a surface configuration that promotes a mechanical connection with an adhesive,
  the lower side surface configuration including a protrusion extending from the base to a crown, and including an undercut portion configured to form a mechanical connection with the adhesive,
  in use adhesive fills between the protrusions and forms a mechanical connection with the undercut portions when hardened.
Preferably the adhesive is restricted to the lower side by the base.

Preferably the lower side of the base includes a plurality of recesses formed adjacent and complimentary to the protrusion, each recess having an open end to permit air to escape when adhesive is applied to the fastener.

Preferably the fastener part is fabricated from a low friction plastic.

Preferably the undercut portions have an overhang between the base and the peak of at least 0.7 mm.

Preferably the height of protrusion between the base and the crown is less than 5 mm.

Preferably the protrusions are substantially symmetrical.

Preferably the protrusion comprises a plurality of elongate ridges that extend across the base and are joined at a central position.

Preferably the base includes a plurality of elongate protrusions, the protrusions being aligned substantially parallel with at least two of the protrusions joined by another protrusion.

Preferably the other protrusion extends transverse to the elongate protrusions.

Preferably the mechanical interengagement between the adhesive and the lower side surface configuration is a minimum of 3 times greater than the force required to disengagement connector.

Preferably a portion of the base includes an area of reduced thickness to permit an optional fastener to be inserted therethrough.

In a further aspect this invention broadly consists in a fastener for mounting a panel to a supporting structure in which the fastener has a surface configured to be adhesively connected to a substrate,
  the surface incorporating a protrusion that extends from the surface to a crown, the cross-section of the protrusions being substantially less at the surface than at the crown,
  in use an adhesive substantially engulfs the protrusions such that when the adhesive hardens a mechanical engagement is created between the adhesive and the protrusions resulting in an increased connection strength.

In a further aspect this invention broadly consists in a method of securing a panel to a supporting structure comprising:
i. securing a plurality of fastener to either the panel or the supporting structure so that a first fastener part is rigidly retained,
ii. applying adhesive to a second fastener part, releasably engaged with the first fastener part of each fastener,
iii. urging the panel toward the supporting structure so that the second fastener part contacts the other of the panel and the supporting structure, and
iv. retaining the panel relative to the supporting structure until the adhesive can support the panel.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The term "comprising" as used in the specification and claims, means "consisting at least in part of" When interpreting a statement in this specification and claims that includes "comprising", features other than that or those prefaced by the term may also be present. Related terms such as "comprise" and "comprises" are to be interpreted in the same manner.

DETAILED DESCRIPTION

According to one preferred aspect, the present invention comprises a fastener for mounting a panel to a support. The invention will be particularly described with reference to the type of panel and type of support commonly found in luxury boats and yachts, however it will be appreciated that the invention can equally be applied to mounting panels in other situations such as quality interior fit outs for buildings of various types, aeroplanes or travel accommodation such as recreational vehicles (RV's), motor homes, and caravans.

Figure 1:
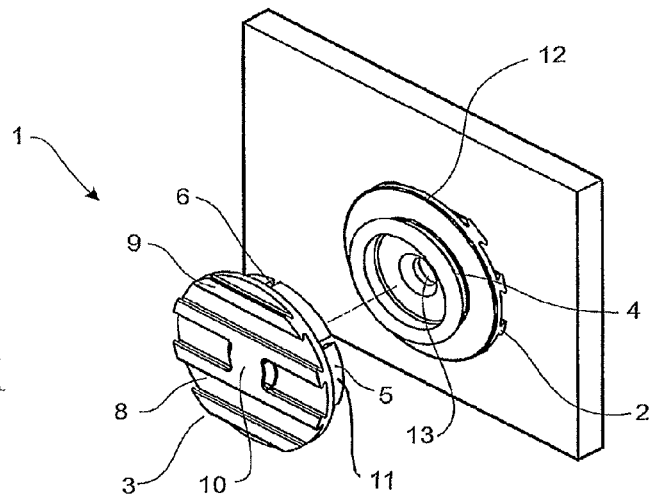
FIG. 1 is an exploded perspective view of a two part dome panel mounting connector according to an embodiment of the present invention.

According to a first preferred embodiment of the invention, the fastener is in the form of a panel clip as illustrated in FIG. 1. The panel clip is a two part connector with interconnecting annular walls 4, 5 located on corresponding clip parts 2, 3. Interconnecting annular walls 4, 5 extend from the respective base portions 11, 12 of the clip parts 2, 3. The panel clip 1 is connected by pressing the two clip parts 2, 3 together in the orientation pictured in FIG. 1.

Secure engagement of the respective clip parts is provided by the interlocking annular wall structure which incorporates an outwardly splayed circumferential lip located on annular wall 4 that engages with an appropriately positioned and commensurately sized recess on annular wall 5.

The engagement of the interlocking annular walls 4, 5 is aided by circumferential gaps 6 which separate annular wall 5 into segments. The individual segments of annular wall 5 are able to flex outwardly to accommodate the circumferential lip of annular wall 4 during engagement and disengagement of panel mounting clip 1.

Clip parts 2, 3 are preferably fabricated from a low friction plastic or plastics to reduce the frictional force required to release the engaged clip parts 2, 3. Accordingly, the release force of the clip is predominantly dictated by the flexural stiffness of the segments of wall 5, the shape of which can be adapted to regulate the release force of the clip Another embodiment of clip according to the present invention is pictured in FIGS. 2 and 3. Panel connector 100 of this embodiment includes a socket component 101 and a plug component 102. At least one of the socket 101 or plug 102 is fitted to the supporting structure and the other is fitted to the panel. Typically, the socket 101 is accommodated within the supporting structure, allowing the plug 102 to be adhesively mounted to the panel. This plug and socket arrangement is preferable as the panel is generally formed from a thin material sheet or is otherwise unsuited to receive the socket 101 or convention fastener.

Figure 5:
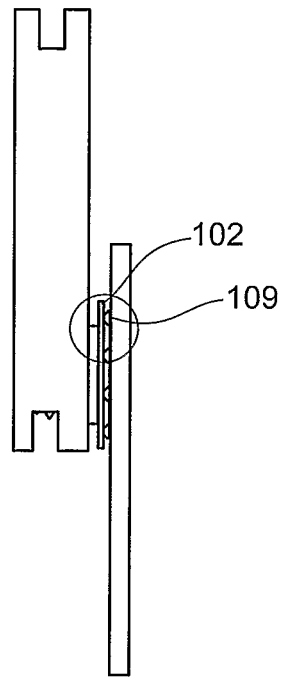
FIG. 5 is a top view of the plug and socket connector of FIG. 2 engaged and supporting a panel.
Figure 5A:
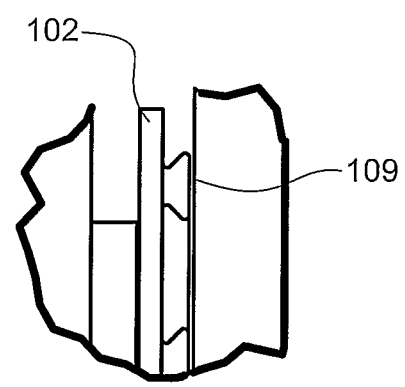
FIG. 5a is a detail view of the connection surface profile indicated in FIG. 5.
Figure 5B:
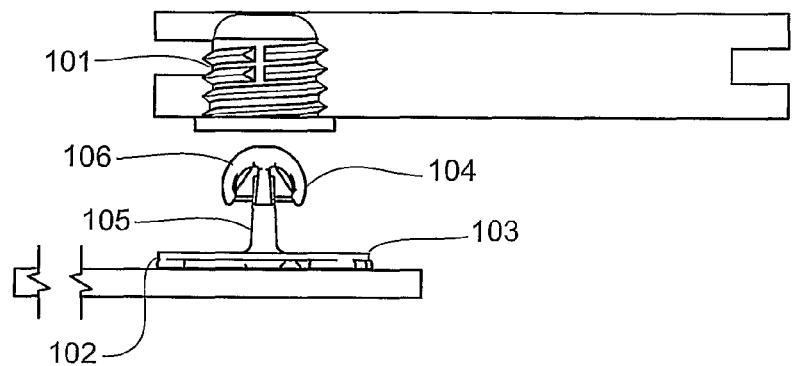
FIG. 5b is a top view of the plug and socket connector of FIG. 5 illustrating the screw engagement of the socket with the support structure in cut away.
Figure 5C:
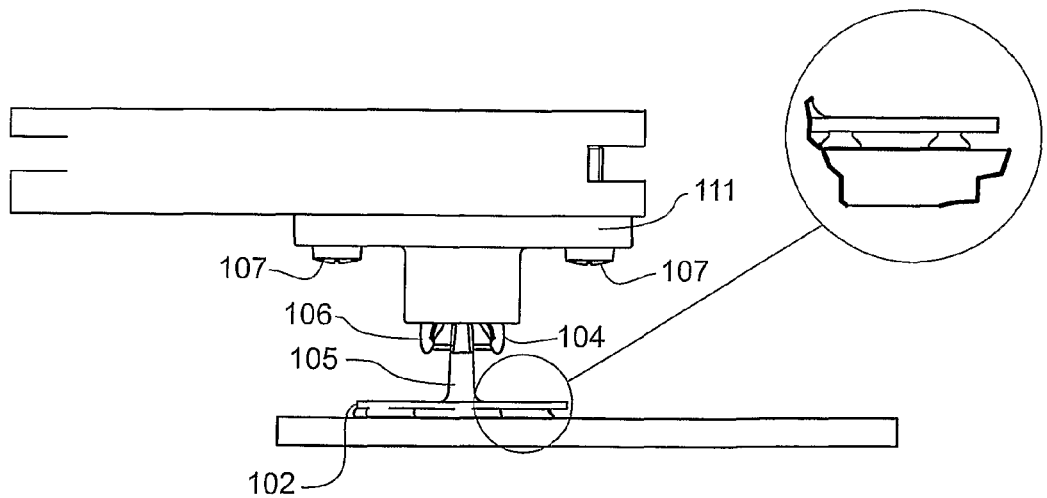
FIG. 5c is a top view of a plug and socket connector incorporating an alternate socket mounting arrangement.

The socket 101 can be retained in different arrangements including the screw engagement illustrated in cut away in FIG. 5b or directly coupled to the corresponding surface by fasteners 107 (where the socket part 111 is external to the surface instead of being recessed), illustrated in FIG. 5c.

Figure 3:
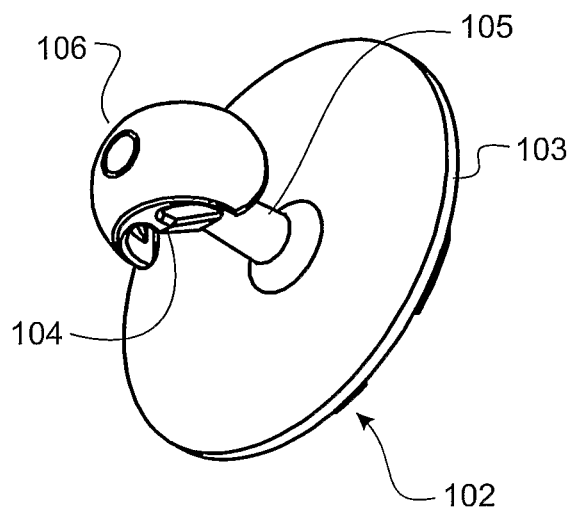
FIG. 3 is a perspective view of the plug component of the panel mounting connector illustrated in FIG. 2.

The plug component 102 is illustrated in more detail in FIG. 3, and includes a base portion 103 and a protruding portion 104. Protruding portion 104 includes a cylindrical body 105 which extends from the base portion 103. At the other end of cylindrical body 105 is a head 106 sized and shaped to fit within socket component 101. The preferred connector mechanism of this embodiment is described in detail in U.S. patent application Ser. No. 11/155,893, which is incorporated herein by reference.

As indicated above, the panel mounting connectors or clips of the present invention are applied in a variety of different circumstances and environments. At least one of the connector parts is glued or otherwise adhesively connected to either the panel or the supporting structure, generally referred to as the substrate. One particular application in which both connector parts may be required to be glued is within aircraft, where it is undesirable to modify the supporting structure or fuselage. In such circumstances, an embodiment similar to that pictured in FIG. 1 can be employed.

One significant complication in designing a universally applicable clip is that the clip parts must be bonded to a variety of different substrate materials, including but not limited to, composites, metals, and various types of wood or fabric. The bonding properties of these materials can vary greatly as a result of the substrate substructure. For instance, an adhesive intended for use with a porous surface substructure, such as certain types of wood or fabric, is not entirely suitable for application to smooth or polished surfaces such as certain metals.

The adhesive used to bond the clip parts generally forms a chemical bond with the substrate. A weak mechanical connection may also be formed in some instances by the permeation of adhesive into voids in the surface substructure of the substrate. Such voids generally arise from surface roughness, but are also inherent in fibrous or porous materials. The strength of adhesive bond formed with different substrates can vary drastically depending on the bonding mechanism (mechanical, chemical, dispersive, electrostatic, diffusive or other). Generally, adhesives are selected for compatibility with the particular substrate to provide the maximum bond strength. However, this means that the clip material and the adhesive are not well suited. This is particularly detrimental as the clip parts are preferably fabricated from low friction materials to reduce the frictional forces involved in disengaging the connectors.

Figure 6:
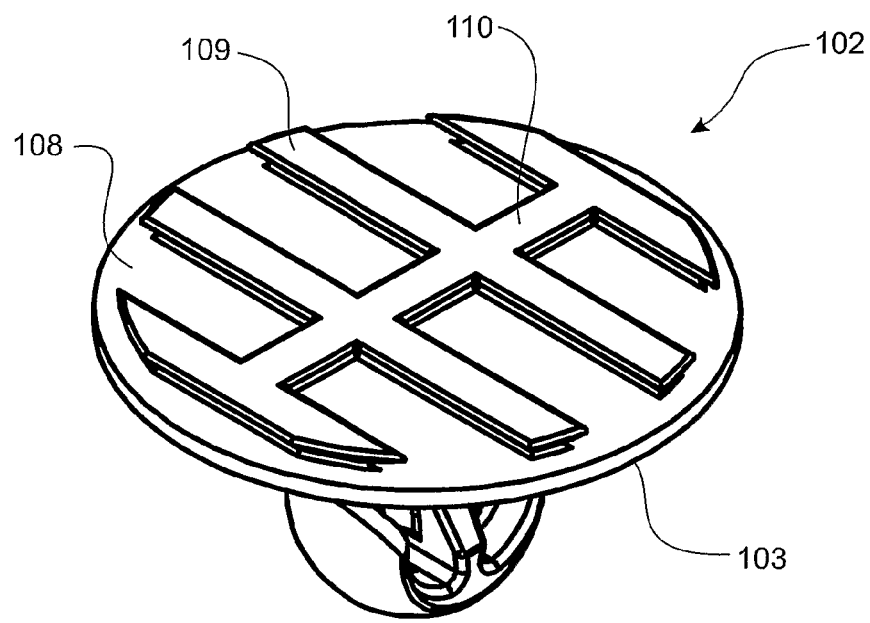
FIG. 6 is a perspective view of the plug and socket connector of FIG. 2 showing the lower side surface configuration.

According to the present invention, to enhance the adhesive characteristics of the panel mounting clip, the adhesive receiving surface is adapted to promote a mechanical engagement with the adhesive. The surface configuration of the present embodiments are evident in FIGS. 1 and 2, with further detail provided in FIGS. 4 to 6. The embodiment pictured in FIG. 1 incorporates channels or grooves 8 and protrusions or ridges 9.

The protrusions 9 extend from the underside of base portion 11 to a crown located away from base 11. Preferably two of more of the protrusions 9 are adapted to contact the substrate surface to ensure a consistent spacing between the base surface and the substrate. While in use a small residual quantity of adhesive may in fact remain between the crowns of these protrusions and the substrate surface, the height of these protrusions effectively defines the permissible depth of adhesive.

By adapting the height of the contacting protrusions (distance between the base 11 and crown), both the depth and distribution of adhesive located between the clip part and substrate can be accurately and reliably controlled. In the pictured embodiment, clip part 3 is adapted to contact a flat substrate surface and provide a substantially even spacing between the substrate and the base portion 11. In the pictured embodiment each protrusion 9 is adapted to contact the substrate, and accordingly the protrusions 9 are of substantially equal height, promoting an even depth of adhesive across the base 11.

The surface configuration could be modified under the same principle for application to a curved substrate surface, or to provide an uneven adhesive distribution.

Figure 4:
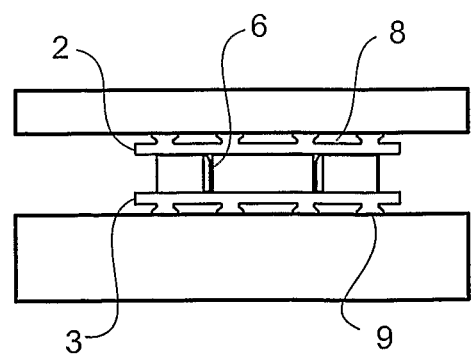
FIG. 4 is a side view of the two part dome connector of FIG. 1 engaged and supporting a panel.
Figure 4C:
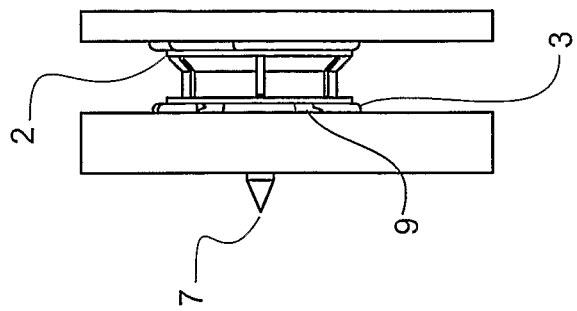
FIG. 4c is a side view of the two part dome connector of FIG. 1 engaged and coupled to the support structure with an optional securing fastener.
Figure 4B:
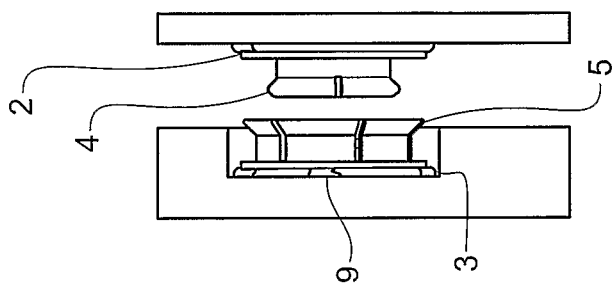
FIG. 4b is a side view of the recessed two part dome connector of FIG. 4a with the connector parts disengaged.
Figure 4A:
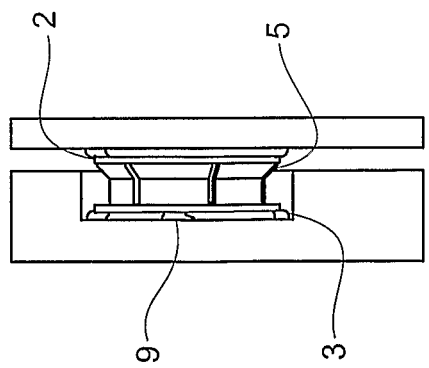
FIG. 4a is a side view of the two part dome connector of FIG. 1 recessed within a supporting structure and engaged to support a panel.

FIGS. 4 to 4c illustrate the clip of FIG. 1 in alternate mounting arrangements. The clip part is adhesively mounted to the supporting structure in FIGS. 4 to 4b, either directly to the outer surface (FIG. 4) or to a recessed surface (FIGS. 4a and 4b). FIG. 4c illustrates an alternate embodiment where the clip part is coupled to the supporting structure with a fastener 7. The fastener 7 may be used in addition to the adhesive coupling or replace the adhesive coupling altogether.

The clip parts are illustrated engaged with the corresponding supporting structure or panel in side view. Ridges 9 of the adhesive surface are substantially symmetric in cross section (although this symmetry is not essential) and incorporate a significant undercut. The undercut is defined by the greater cross-section of ridges 9 at the crown (located away from base 11) than at the base 11. In the pictured embodiment the undercut is a straight cut orientated at approximately 45° to the horizontal. However various undercut configurations, such as curved, stepped or saw-toothed arrangements, are possible. For example, as the dimension of the connector increases, an inverted T-shape configuration is a preferable alternative.

In the embodiment pictured in FIG. 1 the undercut is substantially consistent along the length of the ridge 9 to prevent partial or uneven separation of the clip part from the adhesive. Additionally, connector part 3 of panel clip 1 incorporates a central protrusion or projection 10. In this embodiment, protrusion 10 is integrally formed with the two central ridges 9. Protrusion 10 provides resistance to lateral movement of the clip. The protrusion 10 limits the extension of the middle channel so that it does not extend the full width of the connector.

Preferably the protrusion 10 has a reduced thickness when compared to the remainder of the base 11, visible as recess 13 on clip part 2 in FIG. 1. This configuration facilitates the use of a fastener 7 (such as a screw, rivet or nail) as illustrated in FIG. 4c, either in conjunction with or instead of adhesive, to secure the clip part to the supporting structure or panel. The reduced thickness of protrusion 10 permits the fastener 7 to easily penetrate the base 11 material with minimal affect on the remaining base 11.

As a recess is formed on the upper side of base 11 (resulting from the reduced base 11 thickness and the protrusion 10 on the base 11 lower side), any cracks resulting from penetration of the fastener 7 through the protrusion 11 will be restricted to the area of base 11 defined by boundary of the recessed portion. These cracks are therefore prevented from propagating throughout the base 11 and compromising the integrity of the clip structure. The recess 13 also provides a locating mechanism to align the fastener 7 with the centre of the clip.

The ability to employ a fastener in conjunction with the panel mounting clip provides an optional consideration available to an installer. It is not an essential aspect of the clip part. Accordingly the adhesion promoting under side surface configuration of the clip part is configured to provide sufficient connection strength without the use of additional fasteners. The fastener provisions incorporated in the clip part do not adversely affect the adhesive properties of the lower side surface.

Figure 2:
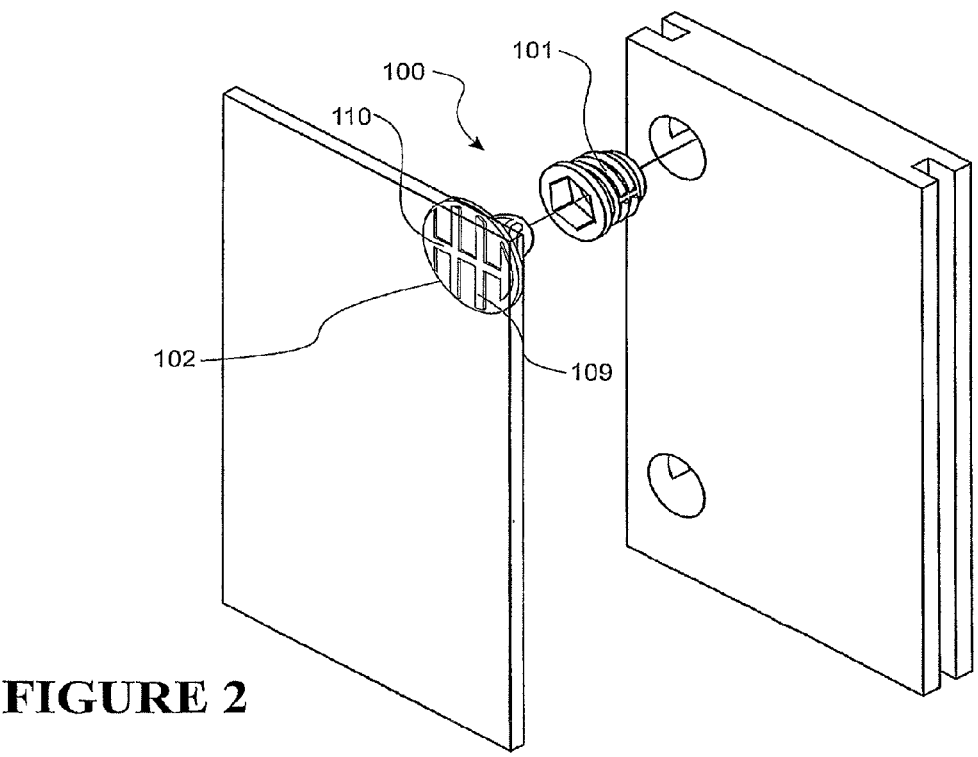
FIG. 2 is an exploded perspective view of an alternative embodiment of a two part plug and socket panel mounting connector according to the present invention.

An alternate embodiment of adhesion promoting surface configuration according to the present invention is pictured in FIG. 2 in association with the plug part 102 of plug 102 and socket 101 connector 100. The plug 102 lower side surface configuration is shown in more detail in FIG. 6. In this configuration the protrusion 109 is again in the formed from elongate ridges, aligned substantially parallel and with ends located adjacent the sides of base 103. A central ridge or spine 110 is located at the centre of base 103, and runs transverse to the ridges 109. The spine 110 connects the array of parallel ridges to form a single protrusion 109.

In the pictured embodiment, the lower side surface of the base 103 is configured such that ridges 109 are spaced regularly to promote even adhesive distribution and consistent connection strength across the base 103 of the clip part. The area defined by the channels 108, as in the previous embodiment, represents the adhesive receiving surface area of the clip part. In use, it is this area of adhesive defined between adjacent ridges 109 which bonds to the substrate. Thus the resulting bond strength with the substrate can be at least partially controlled by varying the width of the channels 108. Similarly to the previous embodiment, the individual ridges and spine of the protrusion 109 incorporate undercut portions which promote mechanical connection between the plug part 102 and the adhesive.

In use adhesive is applied to either the lower side of the clip part or to the appropriate area of substrate. The clip part is then pressed against the substrate while the adhesive is unable to support the panel.

The force applied to the panel equates to a pressure within the adhesive, which causes the adhesive to penetrate the undercut area of the protrusions. It also forces a portion of the adhesive outwardly through the open ends of the lower side surface structure as illustrated in FIG. 7.

The open ended surface structure permits trapped air to be expelled from the lower side of the clip part. This process reduces the possibility of air bubbles forming within the adhesive structure, which can be detrimental to the resulting connection strength.

Figure 7:
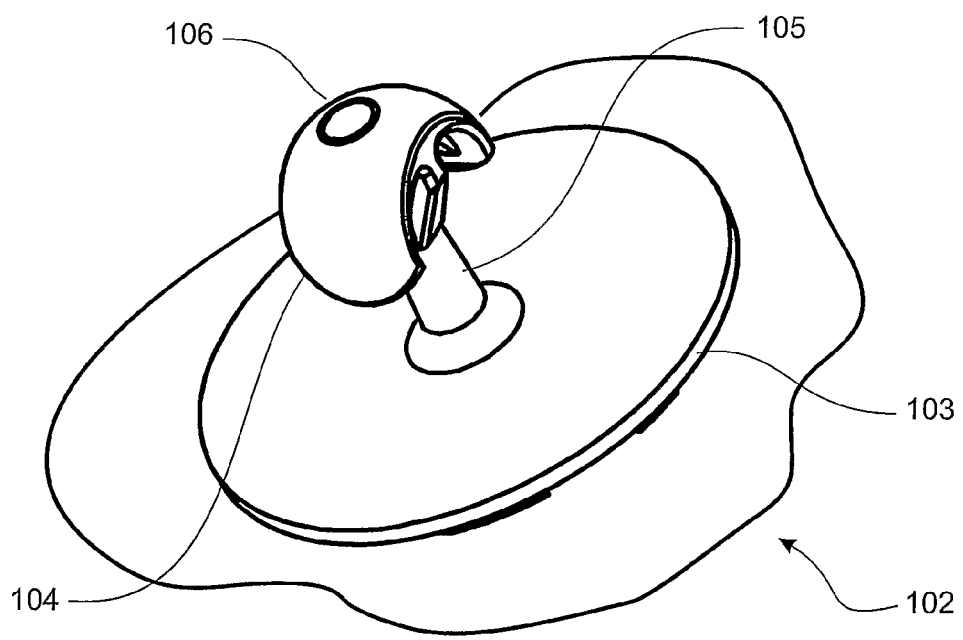
FIG. 7 is a top view of the plug part of the connector in FIG. 2 adhesively connected to a supporting structure and illustrating the excess adhesive displaced around the connector's base.

One important feature of the surface configuration is the restriction of adhesive to the lower side of the clip part as evident in FIG. 7. This prevents the adhesive from interfering with the connector located on the upper side of the clip part. It also prevents the adhesive from bonding to other nearby structures, such as the complimentary clip part, the panel or supporting structure. The controlled manner in which the open ended channels evacuate trapped air and excess adhesive therefore permits the overall thickness of the clip to be reduced.

Once the adhesive has hardened (set or cured), an enhanced mechanical connection is created between the adhesive and the connector part. This is predominantly attributable to the inter-engagement between the adhesive and the lower side surface of clip parts (particularly the undercut portions of protrusions 9), which permits the selection of appropriate adhesive to be based almost entirely on the substrate requirements. The only constraint on adhesive selection is that the chosen adhesive must set hard enough form the mechanical connection or interengagement (discussed in more detail below).

The illustrated surface configuration also provides an increased surface area available for adhesive to bond to via other mechanisms.

When set, the adhesive forms a dovetail type connection with the lower side surface of the connector part. This provides increased resistance to forces applied perpendicular to the base of the clip part (such as the force endured during disengagement of the connector), as well as increased connection strength in shear. In the embodiments incorporating the elongate ridge structure, the greatest increase in shear resistance is experienced transverse to the majority of ridges.

In general, the adhesives used to connect the clip part to the substrate are commonly of medium to high viscosity. The ability of high viscosity adhesives to penetrate into the undercut areas of the protrusion and provide an effective mechanical connection is restricted in applications involving clips of smaller dimension. This restriction provides a practical limit to the application of this undercut surface configuration.

In general, the limiting dimension in any undercut configuration (straight, curved, stepped, inverted T section etc) is a minimum overhang of approximately 0.7 mm. This restriction refers to the lateral (parallel to the base of the clip) difference in dimension between the crown cross-section (located away from the base), and the base cross-section on a single side of the protrusion.

For a straight undercut, the permissible range of undercut angles (formed with clip base) is between 30° and 60°. However 45° is preferable. The undercut angle directly affects the ability of the adhesive to penetrate into the undercut portions of the protrusion, as well as the force distribution over the adhesive.

In general, a low undercut angle can restrict the flow of adhesive into the undercut area, but provides a greater resistance to forces perpendicular to the clip base. The converse is true of high undercut angles. That is they permit greater penetration into the undercut area but provide a lesser resistive force, and are thus more susceptible to clip 'pull off'.

Other considerations limiting the undercut surface configuration are the flexibility of the clip material and adhesive. In general, it is preferable that both the clip material and adhesive be substantially rigid. However, small amounts of flex in both the adhesive and the clip material are inevitable. In fact it is undesirable for the adhesive to be completely rigid, as this generally corresponds to a brittle adhesive interface which is detrimental in some of the intended applications (yachts, airplanes, RV's etc) as a result of the inherent and unavoidable movement involved.

Surface configurations of smaller dimension can be susceptible to premature disengagement if there is excessive flexibility of either the adhesive or clip part, rendering the undercut ineffective.

Manufacturing considerations also place a practical restriction on the lower viable limit for the clip part dimensions. Fabrication restrictions results predominantly from radiusing of the undercut protrusion at the base and crown edge. In larger surface configurations, radiusing limitations are negligible and can be ignored. However, as the dimension of the protrusion decreases, radiusing reduces the effective surface area of the undercut engagement, which detrimentally affects the interengagement of the clip and adhesive.

Adhesive thicknesses in excess of 5 mm are also undesirable as they commonly result in higher rates of cohesive failure, which are generally attributable to inconsistent adhesive curing. This general intolerance to excessive thickness is common among the widely available adhesives used in the industry, and is not a direct restriction on the undercut surface design.

For design purposes, it is desirable that the strength of adhesive connection formed between the clip part and the substrate be a minimum of three times greater than the force required to disengage the connector. For panel mounting applications this translates to a connection strength of between approximately 60 and 600 Newton's, depending on the implementation. Experimental results obtained by the applicant during development indicate that a flat or unmodified lower side surface configuration can not reliably fulfil this requirement, even with a desirable clip material/adhesive combination. In fact a number of trials resulted in connections of insufficient strength to permit adequate disengagement of the connector prior to failure of the adhesive connection.

Alternately, a greater "pull of" resistance (compared to the flat or unmodified surface configuration) can be achieved by incorporating a plurality of perforations in the base of the clip part which permit some of the adhesive to flow through to the upper side of the base. However this design generally results in unpredictable failure characteristics, including irregular detachment forces and localised failure resulting in uneven break away over the adhesive interface. These irregularities are at least partially attributable to inconsistent adhesive distribution between the clip part and the substrate (as there is no mechanism to regulate adhesive distribution), introduction of air bubbles into the adhesive and mechanical deterioration of the hardened adhesive on the upper side of the base part.

Perforating the base also restricts the overall clip design as provisions to prevent adhesive interfering with the connectors or inadvertently bonding to the other clip part, panel or supporting structure are required.

This specification describes two specific embodiments of the panel mounting clip. Various other embodiments of the clip incorporating adhesion promoting surface configurations are also anticipated.

Figure 8:
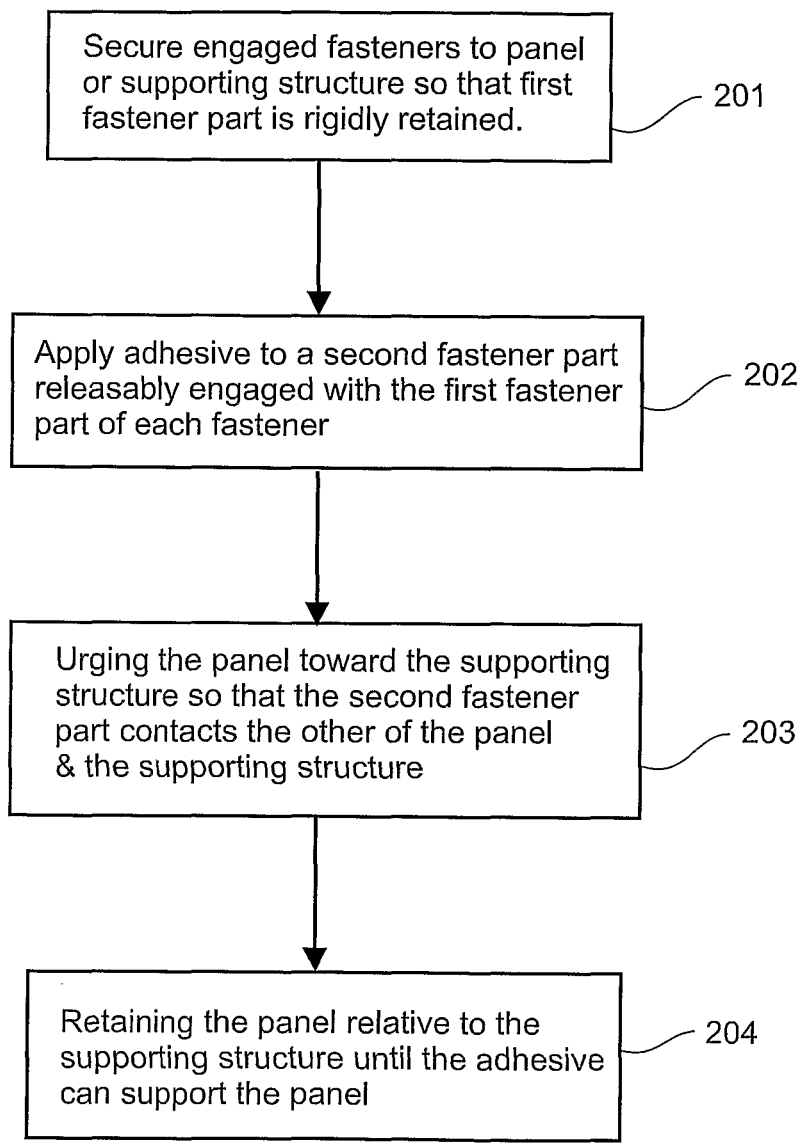
FIG. 8 is a flow chart illustrating a preferred method for installing a panel using a panel mounting fastener according to the present invention.

One particular advantage of using adhesive to secure the clip to at least one substrate is that the panels can be accurately aligned in a relatively simple and fast installation process as illustrated in FIG. 8.

The first step of the installation process 201 involves securing a plurality of fasteners to either the panel or the supporting structure so that a first fastener part is rigidly retained. This may involve using adhesive to retain the first fastener part and the respective substrate (as illustrated in FIG. 1) or mechanically securing the first fastener part to the respective mounting surface (as illustrated in FIG. 2). Preferably the parts comprising the fastener are engaged prior to the first fastener part being secured.

The next step 202 involves applying adhesive to each of the second fastener parts while they are releasably coupled to the first fastener parts secured in step 201.

The panel can then be aligned relative to the supporting structure, other panels and surrounding décor before the adhesive surface of the second fastener part is brought into contact with the respective substrate. Once the panel is adequately aligned it is urged toward the supporting structure so that the second fastener part contacts the other of the panel in the supporting structure, bringing the adhesive into contact with the substrate as represented by step 203.

The panel is retained relative to the supporting structure until the adhesive can support the panel weight as indicated in step 204.

This installation method provides a quick and reliable way to align and secure the panel without having to separately adjust individual fasteners.

The invention claimed is:

1. A fastener for mounting a panel to a supporting structure including a fastener part comprising a base with an upper and lower side,
   - a connector projecting from the upper side of the base adapted to engage with another fastener part,
   - the lower side of the base adapted to be adhesively connected to a substrate and incorporating a lower side surface configuration that promotes a mechanical connection with an adhesive,
   - the lower side surface configuration including a plurality of protrusions, each protrusion extending from the base to a crown, with each protrusion including an undercut portion configured to form a mechanical connection with the adhesive, the cross-section of the protrusions being substantially less at the base than at the crown,
   - the base including a plurality of elongate protrusions arranged substantially parallel, with at least two of the elongate protrusions being joined by another protrusion,
   - in use adhesive fills between the protrusions and forms a mechanical connection with the undercut portions when hardened.

2. The fastener for mounting a panel to a supporting structure in accordance with claim 1 wherein the adhesive is restricted to the lower side by the base.

3. The fastener for mounting a panel to a supporting structure in accordance with claim 1 wherein the lower side of the base includes a plurality of recesses formed adjacent and complimentary to the protrusion, each recess having an open end to permit air to escape when adhesive is applied to the fastener.

4. The fastener for mounting a panel to a supporting structure in accordance with claim 1 wherein the fastener part is fabricated from a low friction plastic.

5. The fastener for mounting a panel to a supporting structure in accordance with claim 1 wherein the undercut portions have an overhang between the base and a peak of at least 0.7 mm.

6. The fastener for mounting a panel to a supporting structure in accordance with claim 1 wherein the height of protrusion between the base and the crown is less than 5 mm.

7. The fastener for mounting a panel to a supporting structure in accordance with claim 1 wherein the protrusion is substantially symmetrical.

8. The fastener for mounting a panel to a supporting structure in accordance with claim 1 wherein the protrusion comprises a plurality of elongate ridges that extend across the base and are joined at a central position.

9. The fastener for mounting a panel to a supporting structure in accordance with claim 1 wherein the base includes a plurality of elongate protrusions, the elongate protrusions being arranged substantially parallel, at least two of the elongate protrusions being joined by another protrusion.

10. The fastener for mounting a panel to a supporting structure in accordance with claim 9 wherein the other protrusion extends transverse to the elongate protrusions.

11. The fastener for mounting a panel to a supporting structure in accordance with claim 1 wherein the mechanical interengagement between the adhesive and the lower side surface configuration is a minimum of 3 times greater than the force required to disengagement connector.

12. The fastener for mounting a panel to a supporting structure in accordance with claim 1 wherein a portion of the base includes an area of reduced thickness to permit an optional fastener to be inserted therethrough.

* * * * *

UNITED STATES PATENT AND TRADEMARK OFFICE
CERTIFICATE OF CORRECTION

PATENT NO. : 8,689,409 B2  Page 1 of 1
APPLICATION NO. : 12/737351
DATED : April 8, 2014
INVENTOR(S) : Hanley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 206 days.

Signed and Sealed this

Twenty-ninth Day of September, 2015

Michelle K. Lee
*Director of the United States Patent and Trademark Office*